US009049342B2

(12) United States Patent
Hori

(10) Patent No.: US 9,049,342 B2
(45) Date of Patent: Jun. 2, 2015

(54) ELECTRONIC CONFERENCE SYSTEM, BAND MANAGEMENT SYSTEM, AND STORAGE MEDIUM HAVING BAND MANAGEMENT PROGRAM STORED THEREIN

(71) Applicant: Takeshi Hori, Kanagawa (JP)

(72) Inventor: Takeshi Hori, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/375,066

(22) PCT Filed: Feb. 14, 2013

(86) PCT No.: PCT/JP2013/000819
§ 371 (c)(1),
(2) Date: Jul. 28, 2014

(87) PCT Pub. No.: WO2013/128827
PCT Pub. Date: Sep. 6, 2013

(65) Prior Publication Data
US 2015/0002613 A1    Jan. 1, 2015

(30) Foreign Application Priority Data
Feb. 27, 2012  (JP) ................ 2012-040212

(51) Int. Cl.
*H04N 7/15*   (2006.01)
*H04M 3/56*   (2006.01)
(Continued)

(52) U.S. Cl.
CPC .......... *H04N 7/15* (2013.01); *H04M 3/567* (2013.01); *H04L 65/4038* (2013.01); *H04L 12/1827* (2013.01); *H04L 47/80* (2013.01); *H04L 65/403* (2013.01)

(58) Field of Classification Search
USPC .................... 348/14.08; 709/204
See application file for complete search history.

(56) References Cited

U.S. PATENT DOCUMENTS

2004/0207724 A1* 10/2004 Crouch et al. ............. 348/14.09
2008/0069011 A1*  3/2008 Sekaran et al. ............ 370/260
(Continued)

FOREIGN PATENT DOCUMENTS

JP         6-133063 A    5/1994
JP         8-88843 A    4/1996
(Continued)

OTHER PUBLICATIONS

Japanese Office Action issued Apr. 16, 2013 in corresponding Japanese Patent Application No. 2012-040212.
(Continued)

*Primary Examiner* — Joseph J Nguyen
(74) *Attorney, Agent, or Firm* — Sughrue Mion, PLLC

(57) ABSTRACT

In a case in which through an Internet, a first exchange system to which a multi-functional telephone of a conference organizer who organizes a conference is connected and a second exchange system to which are connected multi-functional telephones used by conference participants who participate in the conference straddling different bases are connected, when the multi-functional telephones of the plurality of conference participants who participate in the conference are connected to the same exchange system as the second exchange system, in a video conference mixing device in the second exchange system, conference communication information (video image information+audio information) from the multi-functional telephones is previously mixed to be edited into one conference communication information, and the one conference communication information is transmitted to the video conference mixing device in the first exchange system of the conference organizer side.

5 Claims, 6 Drawing Sheets

(51) Int. Cl.
*H04L 29/06* (2006.01)
*H04L 12/18* (2006.01)
*H04L 12/927* (2013.01)

(56) References Cited

U.S. PATENT DOCUMENTS

2011/0085019 A1* 4/2011 Li et al. .................... 348/14.09
2011/0090302 A1* 4/2011 Leviav et al. ............. 348/14.09

FOREIGN PATENT DOCUMENTS

| JP | 2001-274911 A | 10/2001 |
| JP | 2008-306475 A | 12/2008 |
| JP | 2009-232404 A | 10/2009 |

OTHER PUBLICATIONS

International Search Report for PCT/JP2013/000819 dated Apr. 16, 2013.

* cited by examiner

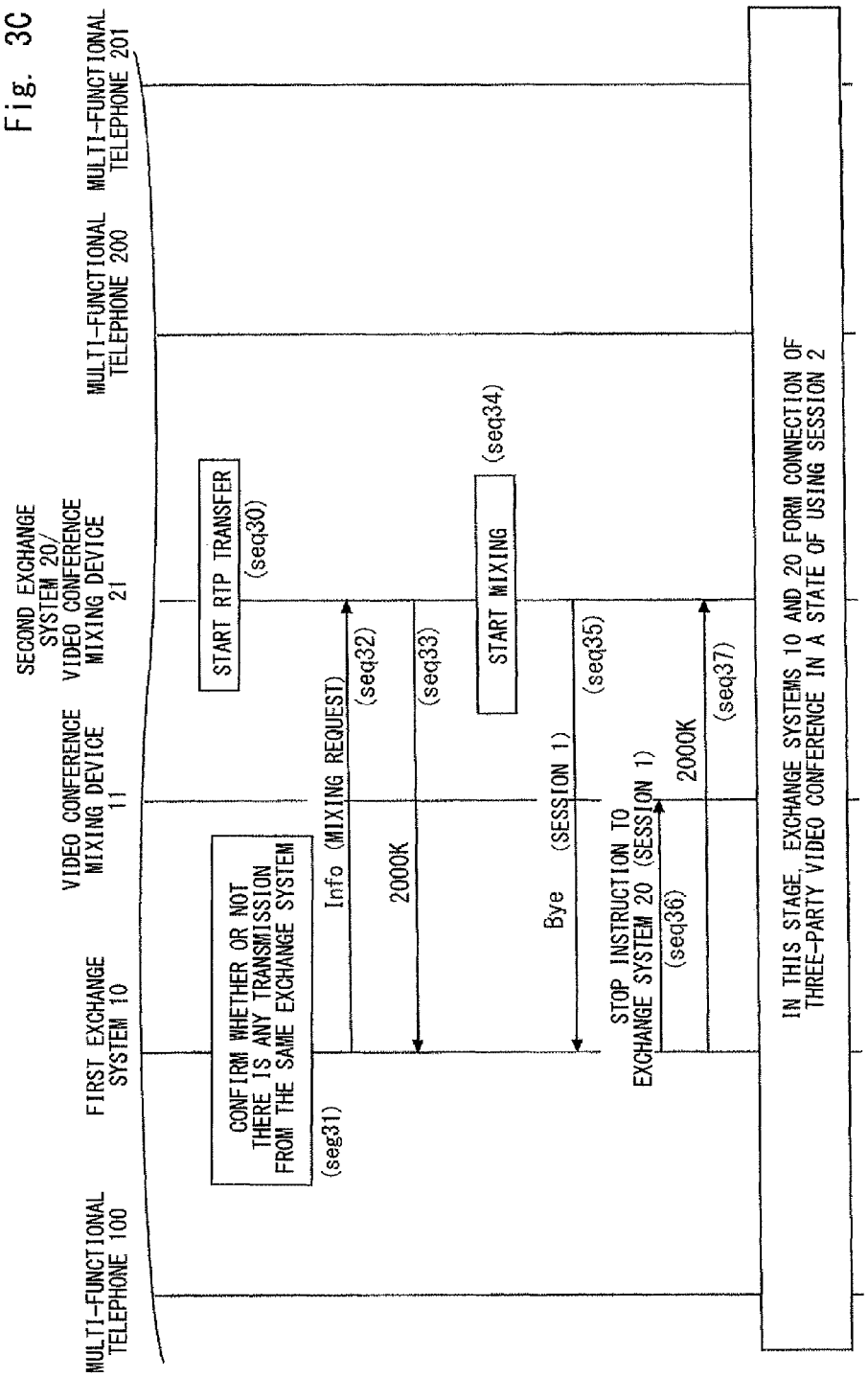

ELECTRONIC CONFERENCE SYSTEM, BAND MANAGEMENT SYSTEM, AND STORAGE MEDIUM HAVING BAND MANAGEMENT PROGRAM STORED THEREIN

CROSS REFERENCE TO RELATED APPLICATIONS

This application is a National Stage of International Application No. PCT/JP2013/000819 filed Feb. 14, 2013, claiming priority based on Japanese Patent Application No. 2012-040212, filed Feb. 27, 2012, the contents of all of which are incorporated herein by reference in their entirety.

TECHNICAL FIELD

The present invention relates to an electronic conference system, a band management method, and a band management program and, in particular, to an electronic conference system, a band management method, and a band management program that can reduce a usage band even in cases of a video conference and an audio conference that straddle bases.

BACKGROUND ART

When a video conference and an audio conference are carried out, as described in Patent Literature 1 "VOICE AND IMAGE CONFERENCE DEVICE" etc., network bands for the number of participants from other bases are needed, and it is difficult to participate in the video conference and the audio conference from the base etc. having a narrow line.

For example, an operation in a case of holding a video conference straddling bases through the Internet is explained using a network connection diagram of FIG. 4 as follows. FIG. 4 is a network connection diagram illustrating a network connection configuration in a case of holding the video conference straddling the bases in a conventional electronic conference system.

In the network connection diagram of FIG. 4, a first exchange system 10A and a second exchange system 20A are connected to each other through an Internet 30. A multi-functional telephone 100 is connected to the first exchange system 10A as a terminal used by a user who is going to organize and hold the video conference, and multi-functional telephones 200 and 201 are connected to the second exchange system 20A as terminals used respectively by two users who are going to participate in the video conference organized by the user of the multi-functional telephone 100 of the first exchange system 10A side.

When three of the multi-functional telephones 100, 200, and 201 carry out the video conference using a video conference mixing device 11A mounted in the first exchange system 10A, first, the multi-functional telephone 100 used by an organizer is connected to the video conference mixing device 11A of the first exchange system 10A, and the multi-functional telephones 200 and 201 used by participants in the video conference are connected to the video conference mixing device 11A of the first exchange system 10A, respectively, via the second exchange system 20A and the Internet 30 without using a video conference mixing device 21A mounted in the second exchange system 20A.

Subsequently, in the video conference mixing device 11A of the first exchange system 10A, conference communication information of audio/Video (video images) from the multi-functional telephone 100, audio/Video from the multi-functional telephone 200, and audio/Video from the multi-functional telephone 201 are mixed, and are distributed to each of the multi-functional telephones 100, 200, and 201, thereby resulting in formation of a video conference network among the three multi-functional telephones.

In such a formation state of the video conference network, as shown in FIG. 4, a state occurs where two sessions of a session 200a for the multi-functional telephone 200 and a session 201a for the multi-functional telephone 201 are formed between the first exchange system 10A and the second exchange system 20A through the Internet 30, and network bands for two multi-functional telephones (audio/Video) are needed.

CITATION LIST

Patent Literature

Patent Literature 1: Japanese Unexamined Patent Application Publication No. 2008-306475 (7 to 9 pages)

SUMMARY OF INVENTION

Technical Problem

As described above, when the video conference and the audio conference are carried out straddling the bases in the conventional electronic conference system, network bands for the number of conference participants who are present in other bases different from the organizer of the conference (band of audio/Video (audio+video images) in the case of the video conference) are needed, and when an available band is narrow, there is a problem that it is difficult to carry out the video conference and the audio conference straddling the bases.

(Object of the Present Invention)

The present invention has been made in view of such a problem, and an object thereof is to provide an electronic conference system, a band management method, and a band management program that can reduce a usage band even in a video conference and an audio conference that straddle bases.

Solution to Problem

In order to solve the above-mentioned problem, an electronic conference system, a band management method, and a band management program according to the present invention mainly employ the following characteristic configurations.

(1) An electronic conference system according to the present invention includes a configuration in which through a network, a first exchange system to which a terminal of a conference organizer who organizes a conference is connected and a second exchange system to which are connected terminals used by conference participants who participate in the conference held straddling different bases by the conference organizer are connected. When the terminals of the plurality of conference participants who participate in the conference of the conference organizer are connected to the same exchange system as the second exchange system of the conference participant side, in a mixing device included in the second exchange system, conference communication information from the terminals of the plurality of conference participants is previously mixed to be edited into one conference communication information, and the one conference communication information is transmitted to the mixing device included in the first exchange system of the conference organizer side.

(2) A band management method according to the present invention is a band management method of a network band in an electronic conference system, the electronic conference system includes a configuration in which through a network a first exchange system to which a terminal of a conference organizer who organizes a conference is connected and a second exchange system to which are connected terminals used by conference participants who participate in the conference held straddling different bases by the conference organizer are connected. When the terminals of the plurality of conference participants who participate in the conference of the conference organizer are connected to the same exchange system as the second exchange system of the conference participant side, in a mixing device included in the second exchange system, conference communication information from the terminals of the plurality of conference participants is previously mixed to be edited into one conference communication information, and the one conference communication information is transmitted to a mixing device included in the first exchange system of the conference organizer side.

(3) A band management program according to the present invention at least carries out the band management method according to (2) as a program executable by a computer.

Advantageous Effects of Invention

According to the electronic conference system, the band management method, and the band management program of the present invention, the following effects can be exerted.

Even when a plurality of conference participants whose respective terminals have been connected to the same second exchange system (base) access the conference system (mixing device) in the first exchange system (base) of the conference organizer side in an attempt to participate in the conference held by the organizer of the first exchange system, a conference network band between the first exchange system of the conference participant side and the second exchange system of the conference organizer side can be reduced.

Namely, since conference communication information (audio information and video image information) from the plurality of conference participants of the same second exchange system (base) of the conference participant side is previously mixed into one piece of conference communication information using the mixing device in the second exchange system of the conference participant side, and thereby the one piece of conference communication information can be treated as one communication session so that network bands for the number of conference participants that access the conference system are not needed as the conference network band between the second exchange system of the conference participant side and the first exchange system of the conference organizer side, the necessary conference network band can be suppressed only to a network band for one session regardless of the number of conference participants.

BRIEF DESCRIPTION OF DRAWINGS

FIG. 3C is a sequence chart for illustrating one example of operation of the first exchange system and the second exchange system shown in FIGS. 1 and 2. (The upper edge of FIG. 3C is a continuation from the lower edge of FIG. 3B).

DESCRIPTION OF EMBODIMENTS

Figure 1:
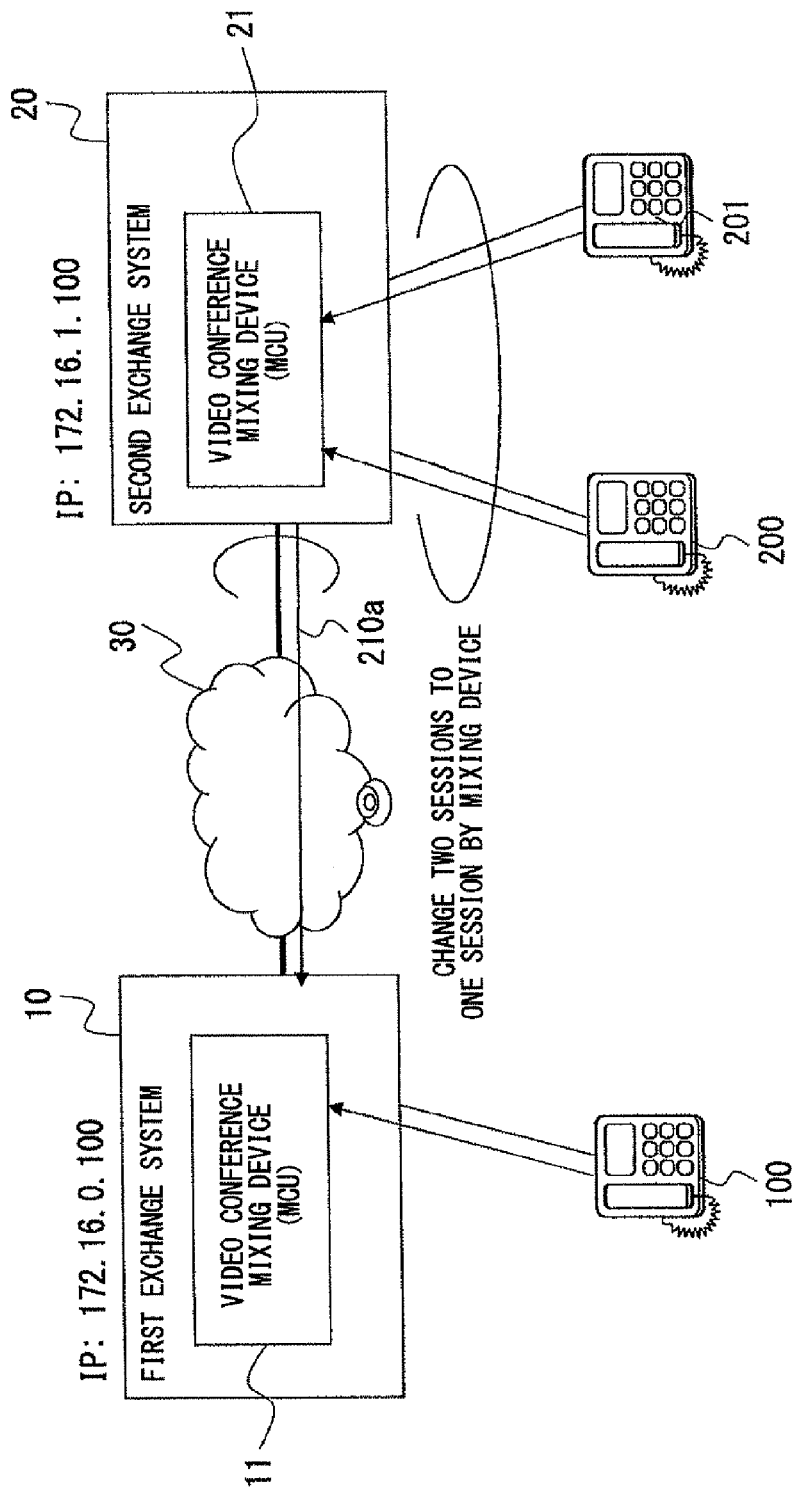
FIG. 1 is a network connection diagram illustrating the network connection situation in a case of holding the video conference straddling the bases in the electronic conference system according to the present invention.

Hereinafter, with reference to accompanying drawings, a preferred embodiment of an electronic conference system, a band management method, and a band management program according to the present invention will be explained. It is to be noted that although in the following explanation, the electronic conference system and the band management method according to the present invention are explained, it is needless to say that such band management method may be carried out as the band management program executable by a computer, or that the band management program may be recorded on a recording medium readable by the computer.

(Features of the Present Invention)

Prior to the explanation of the embodiment of the present invention, a summary of features of the present invention will be first given. The present invention is mainly characterized in that when a video conference and an audio conference are carried out straddling a plurality of exchange systems, in conference communication information of video calls and audio calls being transferred to a first exchange system of a conference organizer side from a second exchange system of a conference participant side through a network, video image signals and audio signals from a plurality of conference participants of the second exchange system are mixed into one video image signal and one audio signal by appropriate respective mixing devices in the second exchange system, and the one video image signal and one audio signal are transmitted to the first exchange system.

That is, the present invention is mainly characterized in that in a case where the plurality of conference participants are present in the same base (second exchange system) different from a base (first exchange system) where the conference organizer of the video conference, the audio conference, etc. is present, in the conference communication information from respective terminals of the plurality of conference participants being transferred from the same second exchange system to the first exchange system to which a terminal of the conference organizer has been connected, the conference communication information from the respective terminals of the plurality of conference participants is mixed into a state in which there is one piece of conference communication information in the same second exchange system to which the terminals of the plurality of conference participants have been connected, and the one piece of conference communication information is transferred to the first exchange system to which the terminal of the conference organizer has been connected.

Consequently, although a plurality of network bands for the number of conference participants who participate in the conference through the network are needed in conventional technologies of a video conference and an audio conference, in the present invention, just one network band may be allocated regardless of the number of conference participants, and the video conference and the audio conference can be carried out straddling bases even in a narrow-band network.

Namely, for example, when the conference participants of the video conference and the audio conference hold a video conference and an audio conference using a telephone A-1 under the control of an exchange system A, telephones B-1 and B-2 under the control of an exchange system B, and telephones C-1 and C-2 under the control of an exchange system C, respectively, under a network environment where the plurality of exchange systems A, B, C, etc. have been connected to a network, for example, in a user of the telephone A-1 serving as a conference organizer, the exchange system A serving as a first exchange system of the conference organizer side and performing mixing, and the conference being held, two sessions were needed between the exchange systems A and B, and also between the exchange systems A and C, respectively in the conventional electronic conference system.

In contrast to this, in the electronic conference system according to the present invention, the exchange system B mixes video image information and audio information of the telephones B-1 and B-2 under the control of the exchange system B, and the exchange system C mixes video image information and audio information of the telephones C-1 and C-2 under the control of the exchange system C, and these exchange systems B and C transmit the mixed video information and audio information to the exchange system A, respectively, so that it is sufficient to allocate only one session between the exchange systems A and B and one session between the exchange systems A and C regardless of the number of conference participants, and a network band can be reduced to achieve effective utilization of a network resource.

(Configuration Example of Embodiment)

Next, a configuration example of an exchange system of the present invention will be explained in detail with reference to drawings. It is to be noted that although a case of holding a video conference straddling bases is explained as an example in the following explanation, it is needless to say that a case of holding an audio conference straddling the bases can also be carried out in a completely similar manner. First, using FIG. 1, a network connection configuration in a case where the video conference is carried out straddling the bases by the exchange system according to the present invention will be explained. FIG. 1 is a network connection diagram illustrating the network connection configuration in a case of holding the video conference straddling the bases in the electronic conference system according to the present invention.

Figure 4:
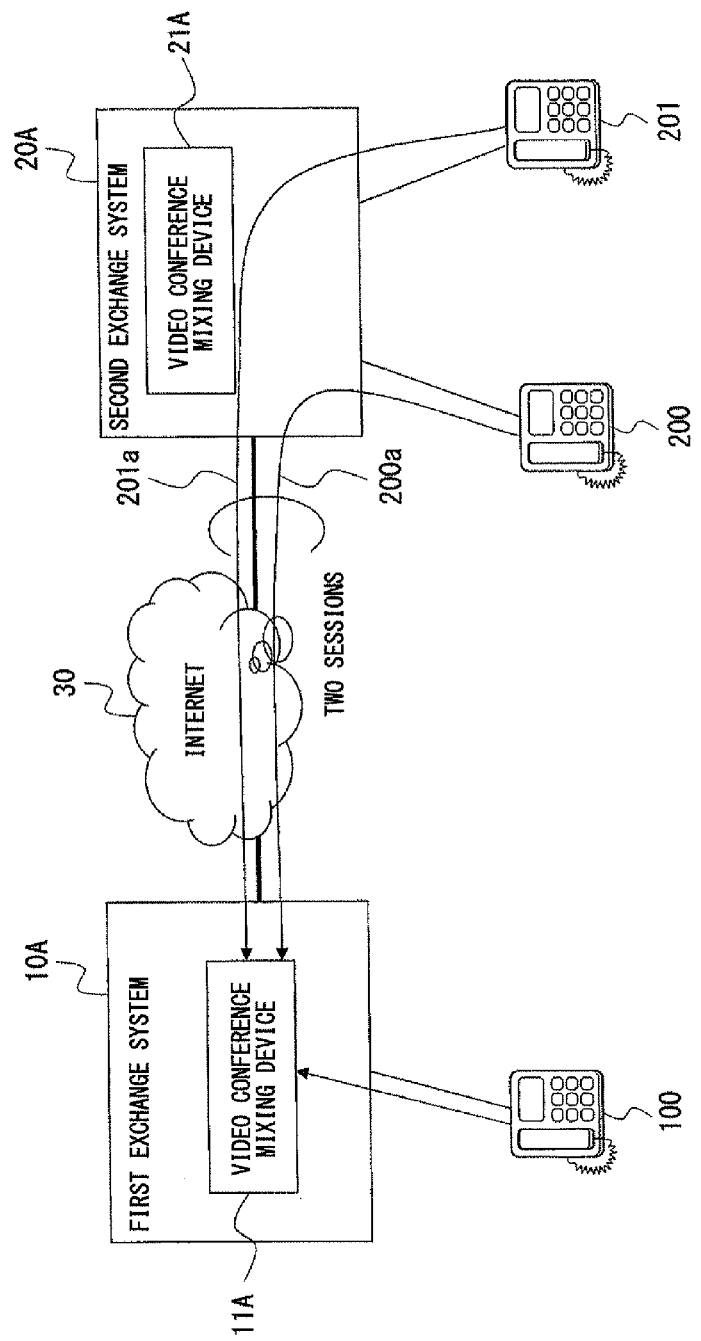
FIG. 4 is a network connection diagram illustrating a network connection situation in a case of holding the video conference straddling the bases in a conventional electronic conference system.

In the network connection diagram of FIG. 1, similarly to the case of FIG. 4 explained in Background Art, a first exchange system 10 and a second exchange system 20 are connected to each other through an Internet 30. A multi-functional telephone 100 is connected to the first exchange system 10 as a terminal used by a user who is going to organize and hold the video conference, and multi-functional telephones 200 and 201 are connected to the second exchange system 20 as terminals used by two respective users who are going to participate in the video conference organized by the user of the multi-functional telephone 100 of the first exchange system 10 side.

When three of the multi-functional telephones 100, 200, and 201 having video call capabilities carry out the video conference using a video conference mixing device 11 mounted in the first exchange system 10 of a conference organizer side, the multi-functional telephone 100 is connected to the video conference mixing device 11 of the first exchange system 10, and unlike the case of FIG. 4 explained in Background Art, the multi-functional telephones 200 and 201 are connected to a video conference mixing device 21 mounted in the second exchange system 20, respectively.

Subsequently, in the video conference mixing device 21 in the second exchange system 20, video conference video image signals from each of the multi-functional telephones 200 and 201 are mixed into one video conference video image signal, and the one video image signal is transmitted to the video conference mixing device 11 of the first exchange system 10 as one session 210a. Subsequently, the one video image signal is further mixed with a video conference video image signal from the multi-functional telephone 100 in the video conference mixing device 11, and the mixed video image signal is distributed to each of the multi-functional telephones 100, 200, and 201. Consequently, a network for three-party video conference straddling different bases is formed only by setting the one session 210a between the first exchange system 10 and the second exchange system 20.

Furthermore, if the video conference mixing device 21 in the second exchange system 20 is provided with mixing performance that can mix not only two video conference video image signals but three or more video conference video image signals into one video conference video image signal, a three or more-party, i.e., multi-party video conference straddling different bases can be held only by setting the one session 210a between the first exchange system 10 and the second exchange system 20 regardless of the number of conference participants.

It is to be noted that as shown in FIG. 1, the video conference mixing devices 11 and 21 are provided with an MCU (Multipoint Control Unit: multipoint connection) function to mix the video conference video image signals from the plurality of multi-functional telephones 100, 200, and 201, and to distribute the mixed video conference video image signal to each of the multi-functional telephones 100, 200, and 201. In addition, in the following explanation, it is assumed that as network addresses for call control in the Internet 30, an IP address "172.16.0.100" is given to the first exchange system 10 and an IP address "172.16.1.100" is given to the second exchange system 20.

Next, an internal configuration in the first exchange system 10 will be explained using FIG. 2. Although FIG. 2 is an internal configuration diagram showing one example of an internal configuration of the first exchange system 10 shown in FIG. 1, an internal configuration of another exchange system, such as the second exchange system 20, other than the first exchange system 10 shown in FIG. 1 is completely the same as the internal configuration of FIG. 2.

Figure 2:
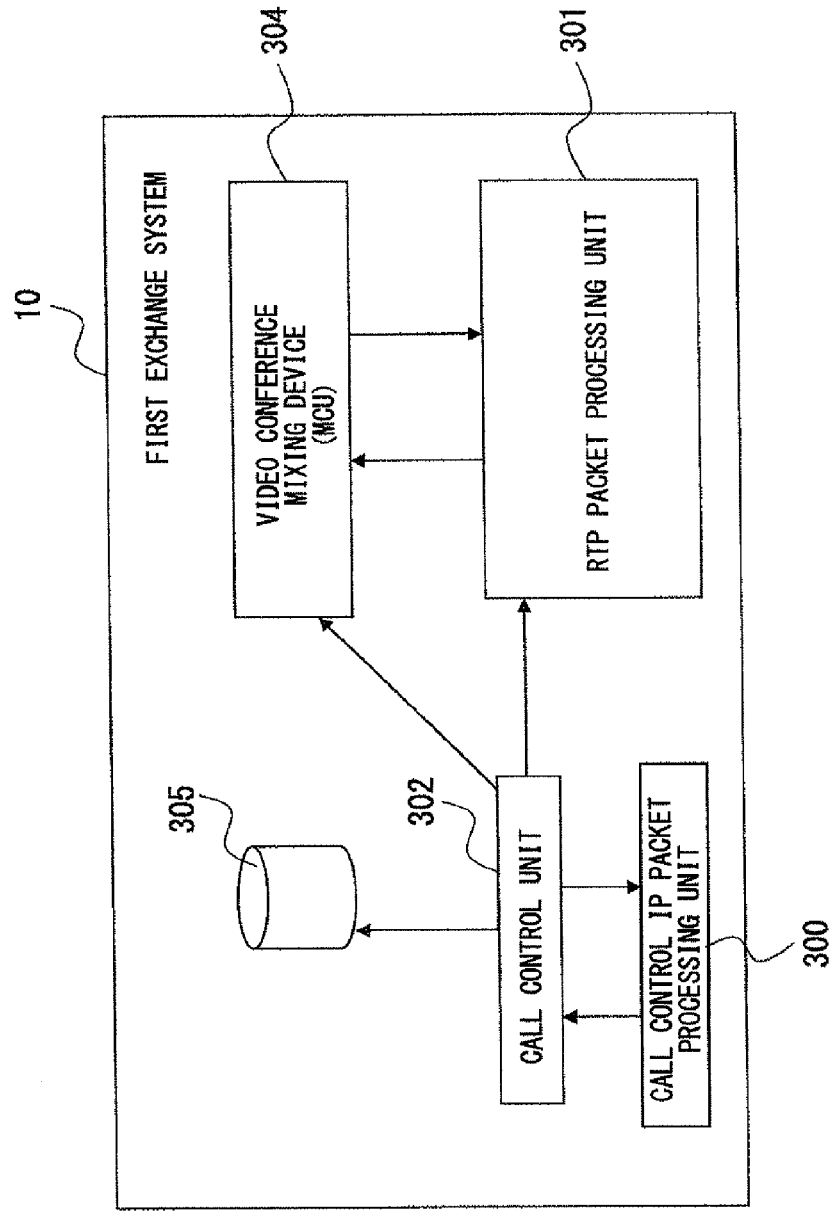
FIG. 2 is an internal configuration diagram showing one example of an internal configuration of the first exchange system shown in FIG. 1.

As shown in the internal configuration diagram of FIG. 2, the first exchange system 10 is configured to include at least: a call control IP packet processing unit 300; an RTP packet processing unit 301; call control unit 302; a video conference mixing device 304; and a database 305. It is to be noted that the video conference mixing device 304 in the first exchange system 10 is the same device as the video conference mixing device 11 in the first exchange system 10 shown in FIG. 1.

The call control IP packet processing unit 300 is connected to the Internet 30 through a LAN (Local Area Network) cable and has a function to transmit/receive an IP packet to/from the Internet 30, and a unique IP address for call control is given to each of the exchange systems one by one as mentioned above; the IP address "172.16.0.100" is given to the call control IP packet processing unit 300 of the first exchange system 10 side, and the IP address "172.16.1.100" is given to the call control IP packet processing unit 300 of the second exchange system 20 side.

The RTP packet processing unit 301 is also connected to the Internet 30 through a LAN cable and has a function to transmit/receive to/from the Internet 30 an IP packet of an RTP (Real-Time Transport Protocol), which is a communication protocol to transfer video image data and audio data in real time, and one unique IP address for RTP packet transmission/reception is given to each of the exchange systems one by one. In addition, the RTP packet processing unit 301 has functions to transmit RTP data of the received RTP packet to the video conference mixing device 304, and to transfer the received RTP packet to a designated IP address.

The call control unit 302 receives from the call control IP packet processing unit 300 a call control message based on a session initiation protocol SIP (Session Initiation Protocol) and a moving picture compression standard H.323 and analyzes it, and has a function to control an incoming call destination based on extension number information etc. saved in the database 305.

The extension number information registered in the first exchange system 10, number information of an opposite exchange system, number information of the video conference mixing device 304, etc. are stored in the database 305, and the database 305 has a function to be accessed from the call control unit 302. In addition, the database 305 also has a function to write and save therein IP address information etc. received as the call control message for the video conference as a participant list of the video conference.

(Explanation of Operation of Embodiment)

Figure 3A:
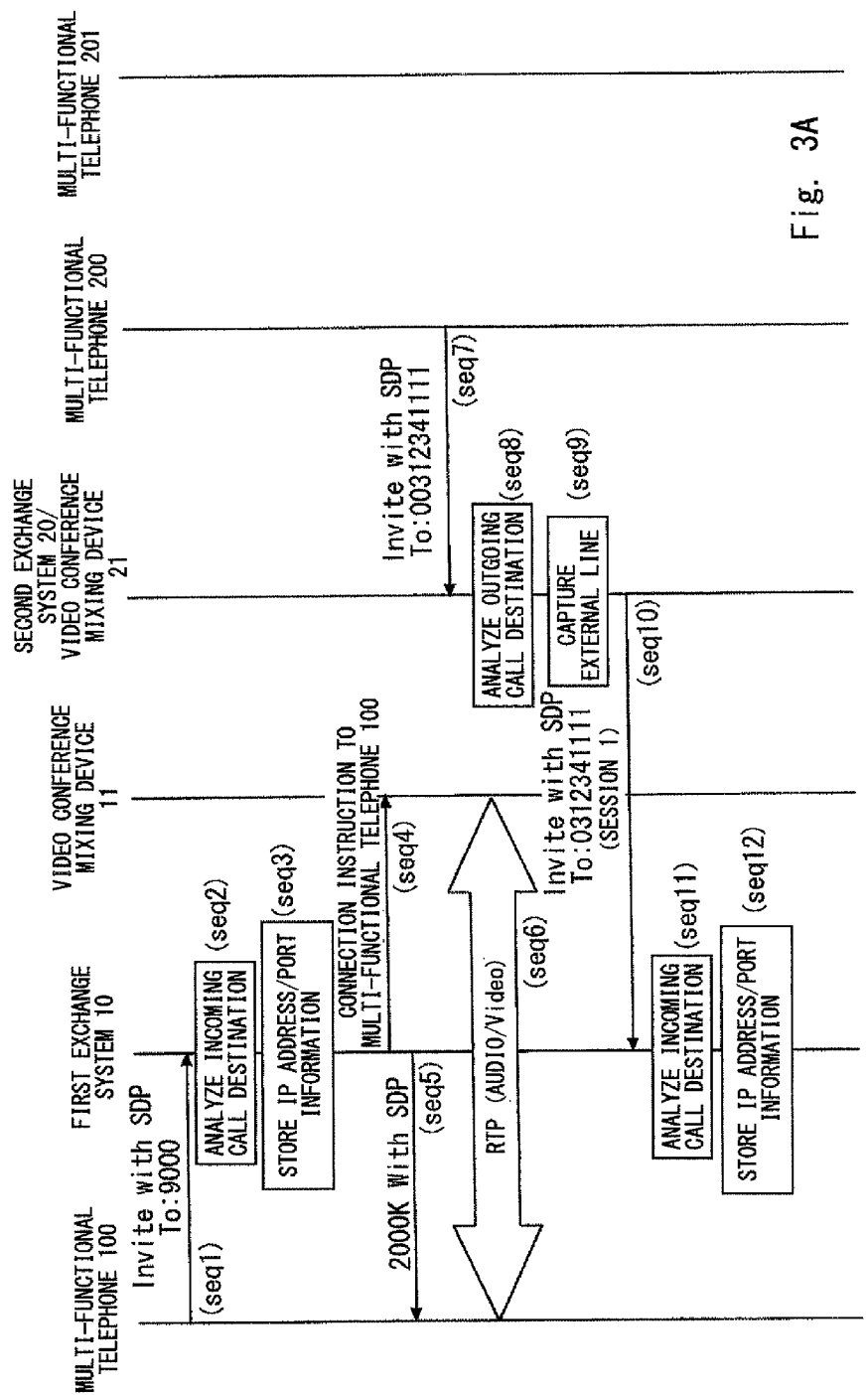
FIG. 3A is a sequence chart for illustrating one example of operation of the first exchange system and the second exchange system shown in FIGS. 1 and 2. (An upper edge of FIG. 3B is a continuation from a lower edge of FIG. 3A.).
Figure 3B:
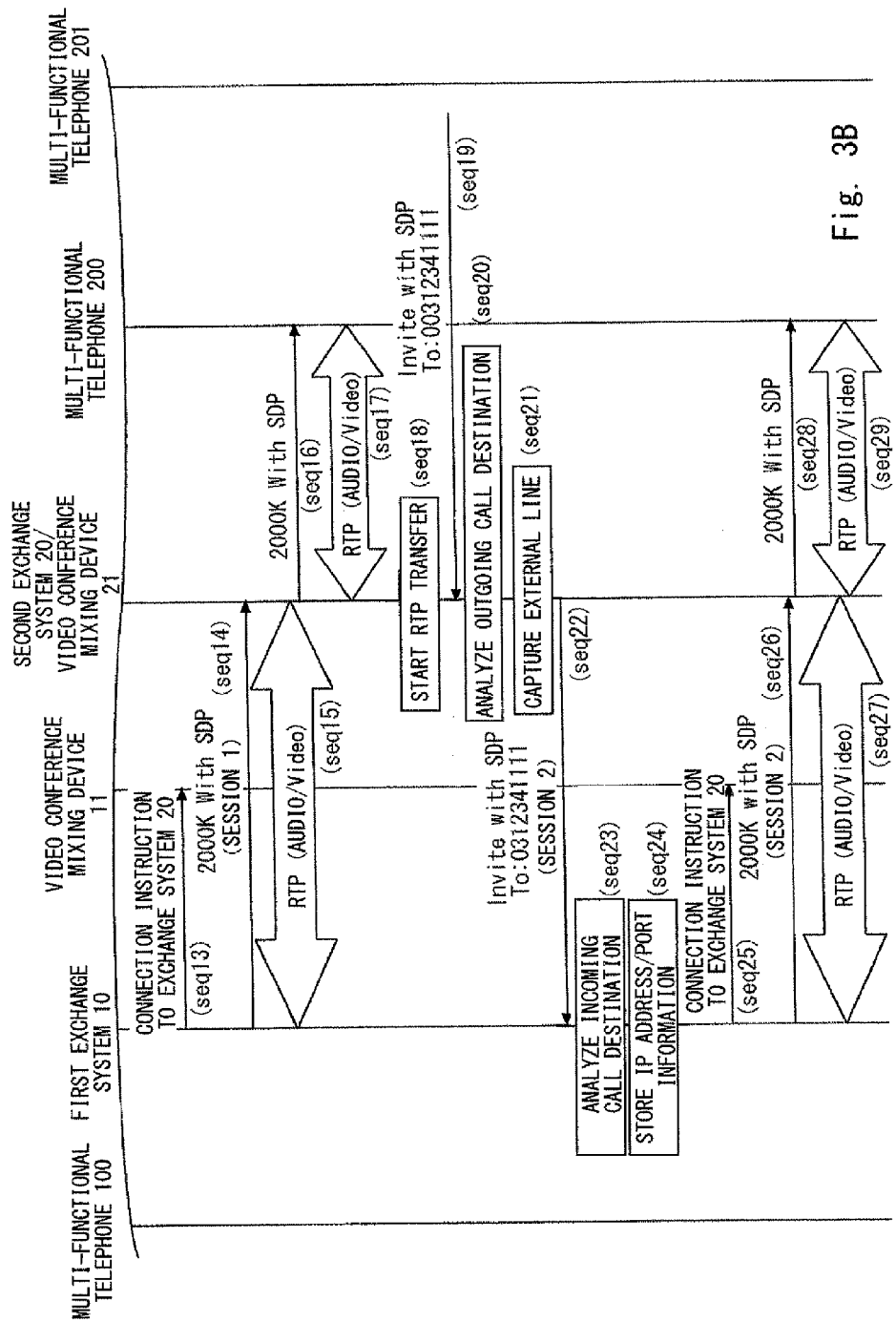
FIG. 3B is a sequence chart for illustrating one example of operation of the first exchange system and the second exchange system shown in FIGS. 1 and 2. (The upper edge of FIG. 3B is a continuation from the lower edge of FIG. 3A, and an upper edge of FIG. 3C is a continuation from a lower edge of FIG. 3B).

Next, using a sequence chart of FIG. 3, one example of operation of the exchange systems of the present invention shown in FIGS. 1 and 2 will be explained. FIG. 3 is a sequence chart for illustrating one example of operation of the first exchange system 10 and the second exchange system 20 shown in FIGS. 1 and 2, and shows a case of using the session initiation protocol SIP (Session Initiation Protocol) as a call control protocol for carrying out exchange operation of the first exchange system 10 and the second exchange system 20 for the video conference. FIG. 3 is unavoidably depicted by being divided into FIGS. 3A, 3B, and 3C due to limitation of a paper space in the illustration. That is, FIG. 3 is configured by connecting these FIGS. 3A, 3B, and 3C, in that order.

In addition, in the sequence chart of FIG. 3, exchange of call control signals (messages) and RTP packets that are transmitted/received in each of the first exchange system 10, the video conference mixing device 11 mounted in the first exchange system 10, the second exchange system 20, the video conference mixing device 21 mounted in the second exchange system 20, the multi-functional telephone 100 connected to the first exchange system 10, and the multi-functional telephones 200 and 201 connected to the second exchange system 20 among components included in the network shown in FIG. 1 is time-sequentially shown.

It is to be noted that it is assumed that the number of the first exchange system 10 for holding the video conference is set to be an extension No. '9000', and that an SIP trunk whose telephone number is '03-1234-1111' is accommodated in the first exchange system 10. In addition, it is assumed that a call control system of the first exchange system 10 is set to receive an incoming call by the extension No. 9000 (number for the video conference) when receiving the external number '03-1234-1111' in the SIP trunk.

In the sequence chart of FIG. 3, first, a user A who organizes the video conference takes up (unhooks) a handset of the multi-functional telephone 100 connected to the first exchange system 10, and dials the dial No. '9000'. The multi-functional telephone 100 creates an Invite message in which extension number information '9000' has been set to a To header based on the session initiation protocol SIP, sets the Invite message to be a form of an IP packet (Invite with SDP) to which the IP address '172.16.0.100' and a port number '1010' of the first exchange system 10 for the video conference have been given as session description protocol SDP (Session Description Protocol) information, and transmits the IP packet (Invite with SDP) to the first exchange system 10 (sequence Seq 1).

The first exchange system 10 receives the IP packet (Invite with SDP) from the multi-functional telephone 100 in the call control IP packet processing unit 300, and outputs a data portion of the received IP packet (Invite with SDP) to the call control unit 302. The call control unit 302 analyzes the data received from the call control IP packet processing unit 300, recognizes it as the Invite message of the SIP, also further analyzes number information of the Invite message, and determines that it is an incoming call to the extension number '9000' (video conference) (sequence Seq 2).

The call control unit 302 that has determined the Invite message to be the incoming call to the video conference stores in the database 305 the IP address '172.16.0.100' and the port number '1010' for the video conference from the multi-functional telephone 100 as a participant list of the video conference (sequence Seq 3), and further sends out a connection instruction instructing to connect to the multi-functional telephone 100 with respect to the video conference mixing device 304 (MCU) in the first exchange system 10, i.e., the video conference mixing device 11 (sequence Seq 4).

In addition, in order to transmit a response to the multi-functional telephone 100, which is a transmission source of the IP packet (Invite with SDP), the call control unit 302 creates as SDP information 200OK (200OK with SDP) including IP address/port information of a connection destination of the RTP packet (audio/Video), and outputs it to the call control IP packet processing unit 300. The call control IP packet processing unit 300 that has received 200OK (200OK with SDP) edits the received 200OK into an IP packet (200OK with SDP), and transmits it to the multi-functional telephone 100 as instructed by the call control unit 302 (sequence Seq 5).

The multi-functional telephone 100 that has received the IP packet (200OK with SDP) from the first exchange system 10 creates an RTP packet (audio/Video) for the video conference, and starts an operation to transmit it to the first exchange system 10 using the IP address/port information given to the 200OK (200OK with SDP).

Meanwhile, the video conference mixing device 304 in the first exchange system 10 that has received the connection instruction instructing to connect to the multi-functional telephone 100 from the call control unit 302, i.e., the video conference mixing device 11 starts to output the RTP packet (audio/Video) to the RTP packet processing unit 301. As a result of this, the state of the RTP packet processing unit 301 becomes a state of having established a communication link through which the RTP packet from the video conference mixing device 304 in the first exchange system 10, i.e., the video conference mixing device 11, is transferred to the multi-functional telephone 100, and through which the RTP packet (audio/Video) received from the multi-functional telephone 100 is transferred to the video conference mixing device 304 in the first exchange system 10, i.e., the video conference mixing device 11 (sequence Seq 6).

Next, a user B who is going to participate in the video conference held by the user A takes up (unhooks) a handset of the multi-functional telephone 200 connected to the second exchange system 20, and dials a dial number '0-03-1234-1111' to which an external line capturing special number '0' has been given. The multi-functional telephone 200 creates an Invite message in which external number information '00312341111' has been set to a To header based on the session initiation protocol SIP, and sets the Invite message to be the form of the IP packet (Invite with SDP) to which the IP address '172.16.0.100' and the port number '1010' for the video conference have been given as the session description protocol SDP information, and transmits the IP packet (Invite with SDP) to the second exchange system 20 (sequence Seq 7).

The second exchange system 20 receives the IP packet (Invite with SDP) from the multi-functional telephone 200 in the call control IP packet processing unit 300, and outputs a data portion of the received IP packet (Invite with SDP) to the call control unit 302. The call control unit 302 analyzes the data received from the call control IP packet processing unit 300, recognizes it as the Invite message of the SIP, also further analyzes the number information of the Invite message, and determines that it is an outgoing call to the external number '03-1234-1111' directed to the first exchange system 10 (sequence Seq 8).

The call control unit 302 that has determined the Invite message to be the external outgoing call captures the external line directed to the first exchange system 10 as a session 1 (sequence Seq 9), also creates an Invite message to which the external number information '0312341111' whose destination is the first exchange system 10 has been set, based on the session initiation protocol SIP, gives to the Invite message the IP address '172.16.1.100' and a port number '10020' of the second exchange system 20 for the video conference as the session description protocol SDP information, and outputs it to the call control IP packet processing unit 300.

The call control IP packet processing unit 300 that has received the Invite message from the call control unit 302 sets the external number information '0312341111' to the To header, sets the Invite message to be a form of an IP packet (Invite with SDP) to which the IP address '172.16.1.100' and the port number '10020' of the second exchange system 20 for the video conference have been given as the session description protocol SDP information, and transmits it to the first exchange system 10 using the captured session 1 (sequence Seq 10).

The first exchange system 10 receives the IP packet (Invite with SDP) from the second exchange system 20 in the call control IP packet processing unit 300, and outputs a data portion of the received IP packet (Invite with SDP) to the call control unit 302. The call control unit 302 analyzes the data received from the call control IP packet processing unit 300, recognizes it as the Invite message of the SIP, also further analyzes the number information '0312341111' of the Invite message, and determines that it is an incoming call to the extension number '9000' (video conference) (sequence Seq 11).

The call control unit 302 that has determined the Invite message to be the incoming call to the extension number '9000' (video conference) stores in the database 305 the IP address '172.16.1.100' and the port number '10020' from the second exchange system 20 that are included in the Invite message as the participant list of the video conference (sequence Seq 12), and subsequently, outputs a connection instruction instructing to connect to the second exchange system 20 with respect to the video conference mixing device 304 (MCU) in the first exchange system 10, i.e., the video conference mixing device 11 (sequence Seq 13).

Furthermore, in order to transmit a response to the second exchange system 20, which is a transmission source of the IP packet (Invite with SDP), i.e., a connection request source of the RTP (audio/Video), the call control unit 302 of the first exchange system 10 creates as SDP information 200OK (200OK with SDP) including IP address/port information of a connection destination of the RTP packet (audio/Video), and outputs it to the call control IP packet processing unit 300. The call control IP packet processing unit 300 that has received the 200OK transmits the received 200OK to the second exchange system 20 as instructed by the call control unit 302 using the session 1 that has received the IP packet (Invite with SDP) (sequence Seq 14).

In addition, the video conference mixing device 304 in the first exchange system 10 that has received the connection instruction instructing to connect to the second exchange system 20 from the call control unit 302 of the first exchange system 10, i.e., the video conference mixing device 11 starts to output the RTP packet (audio/Video) to the RTP packet processing unit 301. In addition, the second exchange system 20 that has received the 200OK message from the first exchange system 10 also creates an RTP packet (audio/Video) for the video conference, and starts an operation to transmit it to the first exchange system 10.

As a result of this, the state of the RTP packet processing unit 301 of the first exchange system 10 becomes a state of having established a communication link through which the RTP packet (audio/Video) from the video conference mixing device 304 in the first exchange system 10, i.e., the video conference mixing device 11, is transferred to the second exchange system 20 side, and through which the RTP packet (audio/Video) received from the second exchange system 20 side is transferred to the video conference mixing device 304 in the first exchange system 10, i.e., the video conference mixing device 11 (sequence Seq 15).

Meanwhile, the second exchange system 20 receives the IP packet (200OK with SDP) from the first exchange system 10 in the call control IP packet processing unit 300, and outputs a data portion of the received IP packet (200OK with SDP) to the call control unit 302. The call control unit 302 analyzes the data received from the call control IP packet processing unit 300, and recognizes it as the 200OK message of the SIP.

The call control unit 302 of the second exchange system 20 that has recognized the reception of the 200OK message from the first exchange system 10 outputs an instruction to transmit the RTP packet (audio/Video) to the first exchange system 10 with respect to the RTP packet processing unit 301, and transmits the IP packet (200OK with SDP) to instruct to transmit the RTP packet (audio/Video) also with respect to the multi-functional telephone 200, which is the transmission source of the IP packet (Invite with SDP) for the video conference (sequence Seq 16). Furthermore, the call control unit 302 of the second exchange system 20 outputs to the RTP packet processing unit 301 an instruction to transfer the RTP packet (audio/Video) transmitted from the multi-functional telephone 200 to the first exchange system 10.

As a result of this, the state of the RTP packet processing unit 301 of the second exchange system 20 becomes a state of having established a communication link through which the RTP packet (audio/Video) from the first exchange system 10 is transferred to the multi-functional telephone 200 side, and through which the RTP packet (audio/Video) received from the multi-functional telephone 200 side is transferred to the first exchange system 10 (sequence Seq 17). Subsequently, the RTP packet processing unit 301 of the second exchange system 20 transfers the RTP packet (audio/Video) from the first exchange system 10 to the multi-functional telephone 200 side, and conversely, starts a transfer operation of the RTP packet (audio/Video) to transfer the RTP packet received from the multi-functional telephone 200 side to the first exchange system 10 (sequence Seq 18).

Furthermore, similarly to the user B, a user C who is going to participate in the video conference held by the user A also takes up (unhooks) a handset of the multi-functional telephone 201 connected to the second exchange system 20, and similarly to the case of the user B, dials the dial number '0-03-1234-1111' to which the external line capturing special number '0' has been given. Similarly to the operation of sequence Seq 7 in the case of the multi-functional telephone 200, the multi-functional telephone 201 creates an Invite message in which the external number information '00312341111' has been set to a To header based on the session initiation protocol SIP, and sets the Invite message to be the form of the IP packet (Invite with SDP) to which the IP address '172.16.0.100' and the port number '1010' for the video conference have been given as the session description protocol SDP information, and transmits the IP packet (Invite with SDP) to the second exchange system 20 (sequence Seq 19).

The second exchange system 20 receives the IP packet (Invite with SDP) from the multi-functional telephone 201 in the call control IP packet processing unit 300, and outputs a data portion of the received IP packet (Invite with SDP) to the call control unit 302. Similarly to the operation of sequence Seq 8 in the case of the multi-functional telephone 200, the call control unit 302 analyzes the data received from the call control IP packet processing unit 300, recognizes it as the Invite message of the SIP, further analyzes the number information of the Invite message, and determines that it is an outgoing call to an external number '03-1234-1111' directed to the first exchange system 10 (sequence Seq 20).

Since the session 1 has already been captured in sequence Seq 9 in the case of the multi-functional telephone 200, the call control unit 302 that has determined the Invite message to be the external outgoing call captures an external line directed to the first exchange system 10 as a session 2 (sequence Seq 21), also creates an Invite message to which the external number information '0312341111' whose destination is the first exchange system 10 has been set based on the session initiation protocol SIP, gives to the Invite message the IP address '172.16.1.100' and the port number '10020' of the second exchange system 20 for the video conference as the session description protocol SDP information, and outputs it to the call control IP packet processing unit 300.

Similarly to the operation of sequence Seq 10 in the case of the multi-functional telephone 200, the call control IP packet processing unit 300 that has received the Invite message from the call control unit 302 sets the external number information '0312341111' to be the To header, sets the Invite message to be a form of an IP packet (Invite with SDP) to which the IP address '172.16.1.100' and a port number '10040' of the second exchange system 20 for the video conference have been given as the session description protocol SDP information, and transmits it to the first exchange system 10 using the captured session 2 (sequence Seq 22).

Hereafter, although the session 2 and the port number '10040' are used as a session and a port number used in exchanging information between the first exchange system 10 and the second exchange system 20, the session 2 and the port number '10040' being different from the session 1 and the port number '10020' in the case of the multi-functional telephone 200, as for the other operation, an operation similar to the operation of sequences Seq 11 to 18 in the case of the multi-functional telephone 200 (sequences Seq 23 to 30) is carried out. As a result of it, a connection configuration of a three-party video conference is formed straddling different bases using as a conference system the video conference mixing device 304 in the first exchange system 10 of the conference organizer side, i.e., the video conference mixing device 11, the connection configuration including: the user A who organizes the video conference using the multi-functional telephone 100 connected to the first exchange system 10; the user B who participates in the video conference using the multi-functional telephone 200 connected to the second exchange system 20; and the user C who participates in the video conference using the multi-functional telephone 201.

When as described above, a state occurs where the connection configuration of the video conference including the plurality of participants is formed straddling the different bases, the call control unit 302 of the first exchange system 10 to which the multi-functional telephone 100 used by the user A as the organizer has been connected confirms whether or not the plurality of participants using the multi-functional telephones connected to the same exchange system, for example, the second exchange system 20, the second exchange system being another exchange system different from the first exchange system 10, are present.

That is, the call control unit 302 of the first exchange system 10 refers to the participant list of the video conference as exemplified in Table 1 saved in the database 305, and confirms whether or not identical IP addresses are present as IP addresses different from the IP address '172.16.0.100' of the first exchange system 10 (sequence Seq 31). If the identical IP addresses are present, it means that a state has occurred where the plurality of participants using the multi-functional telephones connected to the same exchange system are present, a plurality of sessions with the first exchange system 10 are used for one video conference, and a network band corresponding to the number of participants in the video conference is used.

TABLE 1

| No. | IP Address | Port | Connection Destination |
|---|---|---|---|
| 1 | 172.16.0.100 | 1010 | multi-functional telephone 100 |
| 2 | 172.16.1.100 | 10020 | second exchange system 20 session 1 |
| 3 | 172.16.1.100 | 10040 | second exchange system 20 session 2 |

Table 1 shows a registration content stored in the database 305 as the participant list of the video conference in sequences Seq 3, 12, and 24, respectively.

In a case of the registration content of the participant list shown in Table 1, it turns out that two IP addresses '172.16.1.100' of the second exchange system 20, which is a base different from the first exchange system 10, are present, and that they use the sessions 1 and 2, respectively.

Consequently, in order to achieve reduction of the network band used for the video conference, the call control unit 302 of the first exchange system 10 mixes the RTP packets (audio/Video) for the video conference using the sessions 1 and 2, respectively, creates an info message of the SIP that requests to switch to a transfer operation using one session, outputs it to the call control IP packet processing unit 300, and instructs that the info message be transmitted to the second exchange system 20 (IP address '172.16.1.100') that has captured two sessions of the sessions 1 and 2.

The call control IP packet processing unit 300 of the first exchange system 10 edits into an IP packet (info message) the info message (a mixing request) of the SIP received from the call control unit 302 in order to transmit the info message to the second exchange system 20 as instructed by the call control unit 302, and transmits the IP packet to the second exchange system 20 using either the session 1 or 2 (sequence Seq 32).

The second exchange system 20 receives the IP packet (info message) from the first exchange system 10 in the call control IP packet processing unit 300, and outputs a data portion of the received IP packet (info message) to the call control unit 302. The call control unit 302 analyzes the data received from the call control IP packet processing unit 300, and recognizes it as the info message (mixing request) of the SIP.

The call control unit 302 of the second exchange system 20 that has recognized the reception of the info message (mixing request) from the first exchange system 10 creates a 200OK message and outputs it to the call control IP packet processing unit 300 in order to transmit a response to the first exchange system 10, which is the transmission source of the IP packet (info message). The call control IP packet processing unit 300 that has received the 200OK message edits the received 200OK message into an IP packet (200OK), and transmits it to the first exchange system 10 as instructed by the call control unit 302 using the session 1 or 2 that has received the IP packet (info message) (sequence Seq 33).

Furthermore, in order to carry out the mixing operation as instructed by the first exchange system 10, the call control unit 302 of the second exchange system 20 switches a transfer destination of the RTP packets (audio/Video) transmitted from the multi-functional telephones 200 and 201, respectively, to the video conference mixing device 304 in the second exchange system 20, i.e., the video conference mixing device 21, not to the first exchange system 10. Namely, the call control unit 302 of the second exchange system 20 outputs to the RTP packet processing unit 301 an instruction to transfer the RTP packets (audio/Video) transmitted from the multi-functional telephones 200 and 201, respectively, to the video conference mixing device 304 in the second exchange system 20, i.e., the video conference mixing device 21.

In addition, with respect to the video conference mixing device 304 in the second exchange system 20, i.e., the video conference mixing device 21, the call control unit 302 of the second exchange system 20 outputs an instruction to mix the two RTP packets (audio/Video) from the multi-functional telephones 200 and 201 that are transferred from the RTP packet processing unit 301 into one RTP packet (audio/Video), and instructs that the mixed RTP packet (audio/Video) be sent back to the RTP packet processing unit 301.

The video conference mixing device 304 in the second exchange system 20 that has received the instruction from the call control unit 302 of the second exchange system 20, i.e., the video conference mixing device 21 mixes the two RTP packets (audio/Video) from the multi-functional telephones 200 and 201 into one RTP packet (audio/Video), and starts an operation to send it back to the RTP packet processing unit 301 (sequence Seq 34).

The RTP packet processing unit 301 that has received the mixed RTP packet (audio/Video) from the video conference mixing device 304 in the second exchange system 20, i.e., the video conference mixing device 21 starts an operation to transfer the mixed RTP packet (audio/Video) to the first exchange system 10 by an RTP session formed using either of the sessions 1 and 2, for example, the session 2.

After that, the call control unit 302 of the second exchange system 20 starts an operation to open a session that has become unnecessary as the session for the three-party video conference, for example, the session 1. Namely, the call control unit 302 of the second exchange system 20 creates a Bye message of the SIP for disconnecting an unnecessary session, for example, the session 1, with respect to the first exchange system 10, and outputs it to the call control IP packet processing unit 300. The call control IP packet processing unit 300 that has received the Bye message edits the received Bye message into an IP packet (Bye message), and transmits it to the first exchange system 10 as instructed by the call control unit 302 using a session to be disconnected, for example, the session 1 (sequence Seq 35).

The first exchange system 10 receives the IP packet (Bye message) from the second exchange system 20 in the call control IP packet processing unit 300, and outputs a data portion of the received IP packet (Bye message) to the call control unit 302. The call control unit 302 analyzes the data received from the call control IP packet processing unit 300, and recognizes it to be the Bye message (session 1) of the SIP, for example, with respect to the session 1.

The call control unit 302 of the first exchange system 10 that has recognized the reception of the Bye message (session 1) from the second exchange system 20 instructs the video conference mixing device 304 in the first exchange system 10, i.e., the video conference mixing device 11 to stop the operation to output the RTP packet (audio/Video) to the second exchange system 20 using the session 1 (sequence Seq 36), and rewrites into the session 2 information on the session 1 registered in the database 305 as the conference participant list.

Furthermore, in order to transmit a response to the second exchange system 20, which is a transmission source of the IP packet (Bye message), the call control unit 302 of the first exchange system 10 creates a 200OK message, and outputs it to the call control IP packet processing unit 300. The call control IP packet processing unit 300 that has received the 200OK message edits the received 200OK message into an IP packet (200OK), transmits it to the second exchange system 20 as instructed by the call control unit 302 using the session 1 that has received the IP packet (Bye message), and disconnects the session 1 (sequence Seq 37).

When the three-party video conference by two participants who are present in a base of the second exchange system 20 is held, the base being different from a base where the organizer who is going to hold the video conference using the video conference mixing device 11 of the first exchange system 10 is present, two sessions of the sessions 1 and 2 have been needed between the first exchange system 10 and the second exchange system 20 in the related art. However, in the present embodiment, even in a case where two participants are present in the base different from the organizer, it becomes possible to form the connection of the three-party video conference, for example, using only one session of the session 2, i.e., only a network band for one session, by passing through the sequences as shown in FIG. 3.

It is to be noted that although in the present embodiment, the case has been explained where the two participants are present in the base different from the organizer, if a configuration is employed in which three or more parties, i.e., a multi-party video conference can be held as a video conference mixing device, the present invention is not limited only to the case of two parties; that is, the present invention can be applied completely similarly where three or more parties are present as well as where two participants are present. Furthermore, even a case where a plurality of participants may be present in a plurality of bases different from the base where the organizer is present can be treated completely similarly.

In addition, although in the present embodiment, the case of the video conference using video image information has been explained as an example, it is needless to say that reduction of the network band can be achieved in a completely similar manner even in the case of the audio conference using only audio information as mentioned above, or even in a case of a remote education system in which educational guidance is performed through a network from a remote place, etc.

(Explanation of Effect of Embodiment)

As explained in detail above, the following effects can be obtained in the present embodiment.

Even in a case where a plurality of conference participants access the conference system (video conference mixing device 304) in the first exchange system 10 in an attempt to participate in the conference held by the organizer of the first exchange system 10 (base), the plurality of conference participants having connected the multi-functional telephones 200 and 201 to the same second exchange system 20 (base) as their respective terminals, the conference network band between the second exchange system 20 of the conference participant side and the first exchange system 10 of the conference organizer side can be reduced.

Namely, since RTP packets (conference communication information: audio information and video image information) from the plurality of conference participants of the same second exchange system 20 (base) of the conference participant side are previously mixed into one RTP packet (conference communication information) using the conference system (video conference mixing device 304) in the second exchange system 20 of the conference participant side, and thereby the one RTP packet can be treated as one communication session so that network bands for the number of conference participants who access the conference system are not needed as the network band for the conference between the second exchange system 20 of the conference participant side and the first exchange system 10 of the conference organizer side, the necessary conference network band can be suppressed only to a network band for one session regardless of the number of conference participants.

Hereinbefore, configurations of the preferred embodiments of the present invention have been explained. However, note that such embodiments are mere exemplifications of the present invention, and do not limit the present invention at all. Those skilled in the art can easily understand that various modifications and changes can be made according to a particular application without departing from the gist of the present invention.

Although the present invention has been explained as a hardware configuration in the above-mentioned embodiment, the present invention is not limited to this. In the present invention, arbitrary processing can also be achieved by making a CPU (Central Processing Unit) execute a computer program. In this case, the computer program can be provided by recording it on a recording medium, or it can also be provided by transmitting it through the Internet or another communication medium. In addition, a storage medium, for example, includes: a flexible disk; a hard disk; a magnetic disk; a magnetic optical disk; a CD-ROM; a DVD; a ROM cartridge; a RAM memory cartridge with battery back-up; a flash memory cartridge; a nonvolatile RAM cartridge, etc. In addition, the communication medium includes wired communication media, such as a telephone line, wireless communication media, such as a microwave line, etc.

REFERENCE SIGNS LIST

10 First Exchange System
10A First Exchange System
11 Video Conference Mixing Device
11A Video Conference Mixing Device
20 Second Exchange System
20A Second Exchange System
21 Video Conference Mixing Device
21A Video Conference Mixing Device
30 Internet
100 Multi-functional Telephone
200 Multi-functional Telephone
200a Session
201 Multi-functional Telephone
201a Session
210a Session
300 Call Control IP Packet Processing Unit
301 RTP Packet Processing Unit
302 Call Control Unit
304 Video Conference Mixing Device
305 Database

The invention claimed is:

1. An electronic conference system comprising a configuration in which through a network, a first exchange system to which a terminal of a conference organizer who organizes a conference is connected and a second exchange system to which are connected terminals used by conference participants who participate in the conference held straddling different bases by the conference organizer are connected,
wherein when the terminals of the plurality of conference participants who participate in the conference of the conference organizer are connected to the same exchange system as the second exchange system of the conference participant side, in a mixing device included in the second exchange system, conference communication information from the terminals of the plurality of conference participants is previously mixed to be edited into one conference communication information, and the one conference communication information is transmitted to the mixing device included in the first exchange system of the conference organizer side,
in order to discriminate whether or not the terminals of the plurality of conference participants who participate in the conference of the conference organizer are connected in the same exchange system as the second exchange system of the conference participant side, in the first exchange system of the conference organizer side, at least a database for previously registering as a participant list an address to uniquely specify the second exchange system to which the terminals of the conference participants who are going to participate in the conference is included,
when it is detected that identical addresses have been registered in the participant list as the addresses to specify the second exchange system of the conference participant side in the first exchange system of the conference organizer side, a mixing request is transmitted from the first exchange system to the appropriate second exchange system side, the mixing request requesting to previously mix conference communication information from the terminals of the plurality of conference participants, edit into one conference communication information, and transmit the one conference communication information to the first exchange system side.

2. The electronic conference system according to claim 1, wherein in the mixing request from the first exchange system received in the second exchange system of the conference participant side, the conference communication information from the terminals of the plurality of conference participants is output to the mixing device in the second exchange system without performing an operation to respectively transmit the conference communication information to the mixing device in the first exchange system, it is edited into one conference communication information by the mixing device, and subsequently, the one conference communication information is transmitted to the mixing device in the first exchange system.

3. A band management method of a network band in an electronic conference system comprising a configuration in which through a network a first exchange system to which a terminal of a conference organizer who organizes a conference is connected and a second exchange system to which are connected terminals used by conference participants who participate in the conference held straddling different bases by the conference organizer are connected, wherein when the terminals of the plurality of conference participants who participate in the conference of the conference organizer are connected to the same exchange system as the second exchange system of the conference participant side, in a mixing device included in the second exchange system, conference communication information from the terminals of the plurality of conference participants is previously mixed to be edited into one conference communication information, and the one conference communication information is transmitted to a mixing device included in the first exchange system of the conference organizer side, in order to discriminate whether or not the terminals of the plurality of conference participants who participate in the conference of the conference organizer are connected in the same exchange system as the second exchange system of the conference participant side, in the first exchange system of the conference organizer side, at least an address is registered previously as a participant list, the address specifying uniquely the second exchange system to which the terminals of the conference participants who are going to participate in the conference, when it is detected that identical addresses have been registered in the participant list as the addresses to specify the second exchange system of the conference participant side in the first exchange system of the conference organizer side, a mixing request is transmitted from the first exchange system to the appropriate second exchange system side, the mixing request requesting to previously mix conference communication information from the terminals of the plurality of conference participants, edit into one conference communication information, and transmit the one conference communication information to the first exchange system side.

4. The band management method according to claim 3, wherein in the mixing request from the first exchange system received in the second exchange system of the conference participant side, the conference communication information from the terminals of the plurality of conference participants is output to the mixing device in the second exchange system without performing an operation to respectively transmit the conference communication information to the mixing device in the first exchange system, it is edited into one conference communication information by the mixing device, and subsequently, the one conference communication information is transmitted to the mixing device in the first exchange system.

5. A non-transitory computer storage medium storing a computer executable band management program to execute the method of claim 3.

* * * * *